United States Patent
Eyer

(10) Patent No.: US 9,300,896 B2
(45) Date of Patent: Mar. 29, 2016

(54) METHOD, COMPUTER-READABLE STORAGE MEDIUM, RECEPTION APPARATUS, AND INFORMATION PROVIDING APPARATUS FOR IDENTIFYING AVAILABLE CHANNELS AND/OR SERVICES

(71) Applicant: SONY CORPORATION, Tokyo (JP)

(72) Inventor: Mark Eyer, Woodinville, WA (US)

(73) Assignee: SONY CORPORATION, Tokyo (JP)

( * ) Notice: Subject to any disclaimer, the term of this patent is extended or adjusted under 35 U.S.C. 154(b) by 7 days.

(21) Appl. No.: 13/934,615

(22) Filed: Jul. 3, 2013

(65) Prior Publication Data

US 2014/0354890 A1    Dec. 4, 2014

Related U.S. Application Data

(60) Provisional application No. 61/830,500, filed on Jun. 3, 2013.

(51) Int. Cl.

| | |
|---|---|
| *H04N 5/445* | (2011.01) |
| *H04N 7/173* | (2011.01) |
| *H04N 5/50* | (2006.01) |
| *H04N 21/414* | (2011.01) |
| *H04N 21/434* | (2011.01) |

(Continued)

(52) U.S. Cl.
CPC ........... *H04N 5/50* (2013.01); *H04N 21/41407* (2013.01); *H04N 21/4345* (2013.01); *H04N 21/4383* (2013.01); *H04N 21/44209* (2013.01); *H04N 21/4524* (2013.01); *H04N 21/4622* (2013.01); *H04N 21/6112* (2013.01)

(58) Field of Classification Search
CPC ............... H04N 21/41407; H04N 21/4345; H04N 21/4383; H04N 21/44209
See application file for complete search history.

(56) References Cited

U.S. PATENT DOCUMENTS

| | | | |
|---|---|---|---|
| 7,533,399 | B2 | 5/2009 | Ma et al. |
| 8,160,599 | B2 | 4/2012 | Stanforth et al. |

(Continued)

OTHER PUBLICATIONS http://transition.fcc.gov/mb/engineering/dtvmaps/.*

(Continued)

*Primary Examiner* — Dominic D Saltarelli
(74) *Attorney, Agent, or Firm* — Oblon, McClelland, Maier & Neustadt, L.L.P.

(57) ABSTRACT

A method, computer-readable storage medium, reception apparatus, and information providing apparatus for generating a list of accessible channels. The method includes retrieving from a primary server terrestrial broadcast channel information associated with a predetermined geographical region. The terrestrial broadcast channel information includes, for each broadcaster associated with the predetermined geographical region, one or a combination of a broadcast channel and a secondary server location associated with the respective broadcaster. Service information is retrieved, for each of at least one broadcaster associated with the predetermined geographical region, from a secondary server associated with the respective broadcaster based on the terrestrial broadcast channel information. The reception apparatus determines, for each of the at least one broadcaster associated with the predetermined geographical region, whether the broadcast channel associated with the respective broadcaster is receivable by the reception apparatus. The reception apparatus generates the list of accessible channels based on the determination.

21 Claims, 13 Drawing Sheets

(51) Int. Cl.
*H04N 21/438* (2011.01)
*H04N 21/442* (2011.01)
*H04N 21/45* (2011.01)
*H04N 21/462* (2011.01)
*H04N 21/61* (2011.01)

(56) References Cited

U.S. PATENT DOCUMENTS

| | | | |
|---|---|---|---|
| 8,264,608 B2 | 9/2012 | Nakamura | |
| 8,291,464 B2 | 10/2012 | Tomobe et al. | |
| 2002/0059642 A1* | 5/2002 | Russ et al. | 725/135 |
| 2002/0184653 A1* | 12/2002 | Pierce et al. | 725/143 |
| 2007/0089148 A1 | 4/2007 | Oh et al. | |
| 2010/0071019 A1* | 3/2010 | Blanchard et al. | 725/131 |
| 2010/0162323 A1* | 6/2010 | Kitazato | 725/56 |
| 2011/0075990 A1 | 3/2011 | Eyer | |
| 2011/0088075 A1 | 4/2011 | Eyer | |
| 2011/0243536 A1 | 10/2011 | Eyer | |
| 2011/0246488 A1 | 10/2011 | Eyer | |
| 2011/0247028 A1 | 10/2011 | Eyer | |
| 2011/0268095 A1 | 11/2011 | Kim et al. | |
| 2011/0298981 A1 | 12/2011 | Eyer | |
| 2011/0299827 A1 | 12/2011 | Eyer | |
| 2011/0302599 A1 | 12/2011 | Eyer | |
| 2011/0302611 A1 | 12/2011 | Eyer | |
| 2011/0307920 A1 | 12/2011 | Blanchard et al. | |
| 2012/0044418 A1 | 2/2012 | Eyer | |
| 2012/0047531 A1 | 2/2012 | Eyer | |
| 2012/0050619 A1 | 3/2012 | Kitazato et al. | |
| 2012/0050620 A1 | 3/2012 | Kitazato | |
| 2012/0054214 A1 | 3/2012 | Yamagishi et al. | |
| 2012/0054235 A1 | 3/2012 | Kitazato et al. | |
| 2012/0054267 A1 | 3/2012 | Yamagishi et al. | |
| 2012/0054268 A1 | 3/2012 | Yamagishi | |
| 2012/0054783 A1 | 3/2012 | Yamagishi | |
| 2012/0054784 A1 | 3/2012 | Kitazato et al. | |
| 2012/0054816 A1 | 3/2012 | Dewa | |
| 2012/0060197 A1 | 3/2012 | Kitahara et al. | |
| 2012/0063508 A1 | 3/2012 | Hattori et al. | |
| 2012/0072965 A1 | 3/2012 | Dewa | |
| 2012/0081508 A1 | 4/2012 | Kitazato | |
| 2012/0081607 A1 | 4/2012 | Kitazato | |
| 2012/0082266 A1 | 4/2012 | Kitazato et al. | |
| 2012/0082440 A1 | 4/2012 | Kitazato | |
| 2012/0084802 A1 | 4/2012 | Kitazato | |
| 2012/0084824 A1 | 4/2012 | Kitazato | |
| 2012/0084829 A1 | 4/2012 | Kitazato | |
| 2012/0185888 A1 | 7/2012 | Eyer et al. | |
| 2012/0253826 A1 | 10/2012 | Kitazato et al. | |
| 2012/0274848 A1 | 11/2012 | Kitahara et al. | |
| 2012/0275764 A1 | 11/2012 | Eyer | |
| 2013/0024894 A1 | 1/2013 | Eyer | |
| 2013/0024897 A1 | 1/2013 | Eyer | |
| 2013/0031569 A1 | 1/2013 | Kitazato et al. | |
| 2013/0036440 A1 | 2/2013 | Eyer | |
| 2013/0055313 A1 | 2/2013 | Eyer | |
| 2013/0103716 A1 | 4/2013 | Yamagishi | |
| 2013/0145414 A1 | 6/2013 | Yamagishi | |

OTHER PUBLICATIONS

U.S. Appl. No. 13/559,188, filed Jul. 26, 2012, Kitazato.
U.S. Appl. No. 13/587,975, filed Aug. 17, 2012, Kitazato.
U.S. Appl. No. 13/593,554, filed Aug. 24, 2012, Kitazato et al.
U.S. Appl. No. 13/708,313, filed Dec. 7, 2012, Kitazato et al.
U.S. Appl. No. 13/741,863, filed Jan. 15, 2013, Kitazato et al.
U.S. Appl. No. 13/753,591, filed Jan. 30, 2013, Kitazato et al.
U.S. Appl. No. 13/777,429, filed Feb. 26, 2013, Kitazato et al.
U.S. Appl. No. 13/777,693, filed Feb. 26, 2013, Kitazato et al.
U.S. Appl. No. 13/777,734, filed Feb. 26, 2013, Kitazato et al.
U.S. Appl. No. 13/782,694, filed Mar. 1, 2013, Eyer.
U.S. Appl. No. 13/782,730, filed Mar. 1, 2013, Eyer.
U.S. Appl. No. 13/800,818, filed Mar. 13, 2013, Eyer.
U.S. Appl. No. 13/800,734, filed Mar. 13, 2013, Eyer.
U.S. Appl. No. 13/841,343, filed Mar. 15, 2013, Eyer.
U.S. Appl. No. 13/846,282, filed Mar. 18, 2013, Dewa et al.
U.S. Appl. No. 13/846,247, filed Mar. 18, 2013, Kitazato et al.
U.S. Appl. No. 13/888,865, filed May 7, 2013, Kitahara et al.
U.S. Appl. No. 13/894,779, filed May 15, 2013, Yamagishi.
U.S. Appl. No. 13/905,721, filed May 30, 2013, Kitahara et al.
U.S. Appl. No. 13/915,664, filed Jun. 12, 2013, Eyer.
U.S. Appl. No. 13/930,814, filed Jun. 28, 2013, Fay.
U.S. Appl. No. 13/930,880, filed Jun. 28, 2013, Fay et al.
U.S. Appl. No. 13/924,907, filed Jun. 24, 2013, Eyer.
U.S. Appl. No. 13/927,667, filed Jun. 26, 2013, Yamagishi.
International Search Report, Written Opinion and Search History issued Jun. 17, 2014 in PCT/US14/17726.

* cited by examiner

| Call Letters | RF Chan. | Broadcaster URL |
| --- | --- | --- |
| KCTS-TV | 9 | http://kcts-tv.com/dtvmap |
| KSTW | 11 | http://kstw.com/atsc |
| KCPQ | 13 | http://kcpq.com/665-01/3 |
| KTBW-TV | 14 | http://dtv.ktbw.com/data |
| KZJO | 25 | http://07.kzjo-tv.com/555 |
| KBTC-TV | 27 | http:/kbtc-tv.com/dtv1 |
| KONG | 31 | http://a7.kong-tv.com/a7 |
| KWPX-TV | 33 | http://iontelevision.com/kwpx |
| KOMO-TV | 38 | http://fishertv.com/komo/1 |
| KUNS-TV | 50 | http://mediahub.com/kuns |

Next Record

KCTS-TV      WA SEATTLE      USA      (Digital)

Licensee: KCTS TELEVISION
Service Designation: DT   Digital television station

Transmit Channel:   9     186 - 192 MHz    Licensed
Virtual Channel:    9    (viewer sees this channel number)

Network affiliation: PBS

File No.:   BLEDT-20090612AAN    Facility ID number: 33749
CDBS Application ID No.: 1287009

47° 36' 58.00" N Latitude      Site in Canadian Border Zone
122° 18' 28.00" W Longitude (NAD 27)

Polarization: Horizontal (X)
Effective Radiated Power (ERP):      21.7      kW ERP
Antenna Height Above Average Terrain:   249.      meters HAAT -- Calculate HAAT
Antenna Height Above Mean Sea Level:    284.9     meters AMSL
Antenna Height Above Ground Level:      159.9     meters AGL TV Zone: 2

Non-Directional     Antenna ID No.: 87612     Pattern Rotation: 0.00
Antenna Make: DIE    Antenna Model: TW789-R(S)

Additional Individual Tower Information from the Antenna Structure Registration database.
(Use the Registration Number link for detailed information.)

| ASRN | Site Elevation (meters) | Overall Height Above Ground (meters) | Overall Height Above Mean Sea Level (meters) | NAD 83 Tower Coordinates Latitude | Longitude | Convert to NAD 27 |
|---|---|---|---|---|---|---|
| 1032915 | 125.0 | 181.1 | 306.1 | N 47° 36' 57.0" | W 122° 18' 32.0" | To NAD27 |

FAA:   FAA Study No. 1998-ANM-0154-OE   Obstruction/Airport Airspace searches

CDBS:   Station Info    Application Info   Mailing Address   Assignments and Transfers
       Application List   CDBS Search Page   Ownership Info   EEO   Call Sign Changes
       Correspondence for KCTS-TV    Correspondence for application BLEDT-20090612AAN Maps:   Service Contour on Google map (36 dBu)
       KML file (36 dBu) or Text file (36 dBu) for KML-capable browsers
       USGS Topographic map for KCTS-TV's transmitter site (MSRMaps)

Station Profiles and Public Inspection Files for KCTS-TV    [About this information]

ULS:   Related facilities in ULS
      ASRNs within 0.5 km radius

First Record

FIG. 7B

| Channels | DTV Noise-Limited Service |
|---|---|
| Channels 2 through 6 | 28 dBu |
| Channels 7 through 13 | 36 dBu |
| Channels 14 through 69 | 41 dBu |

FIG. 8

METHOD, COMPUTER-READABLE
STORAGE MEDIUM, RECEPTION
APPARATUS, AND INFORMATION
PROVIDING APPARATUS FOR IDENTIFYING
AVAILABLE CHANNELS AND/OR SERVICES

CROSS-REFERENCE TO RELATED APPLICATION

This application claims the benefit of priority of Provisional Application Ser. No. 61/830,500, filed Jun. 3, 2013, the entire contents of which is incorporated herein by reference.

BACKGROUND OF THE DISCLOSURE

1. Technical Field

Embodiments described herein relate generally to a method, computer-readable storage medium, reception apparatus, and information providing apparatus for facilitating the identification of available channels, services, programming information, etc.

2. Background

A user setup function is typically required in traditional digital television receivers, and this function involves a time consuming channel scan process. During channel scan, the receiver generally tunes to each broadcast frequency band, in sequence, to determine whether or not a digital signal is found on that frequency. For those frequencies found to have a broadcast signal, the receiver determines the services (e.g., virtual channels) available within the digital multiplex found in that modulated transmission signal.

SUMMARY OF THE DISCLOSURE

Embodiments of the present disclosure are directed to reducing the amount of time needed to identify available channels and/or services. For example, certain embodiments are directed to reducing the time required to perform the channel scan process of a digital television receiver. Embodiments of the present disclosure also enhance the receiver's performance and adaptability to changes in the landscape of available receiving services, and can enable a mobile receiver to perform optimally as receiving conditions change.

Although the present disclosure is primarily described with respect to scanning television broadcast signals, the embodiments can be applied to identifying available channels and/or services provided via other delivery methods such as cable.

BRIEF DESCRIPTION OF THE DRAWINGS

A more complete appreciation of the present application and many of the attendant advantages thereof will be readily obtained as the same becomes better understood by reference to the following detailed description when considered in connection with the accompanying drawings, wherein:

FIG. 6 shows an exemplary table containing a Broadcast License Data (BLD) File.

FIG. 7A shows exemplary search results from a regional server.

FIG. 7B shows an exemplary detailed record from the regional server.

FIG. 8 shows exemplary minimum signal levels requirements for certain channels to be tunable.

DETAILED DESCRIPTION

Figure 1:
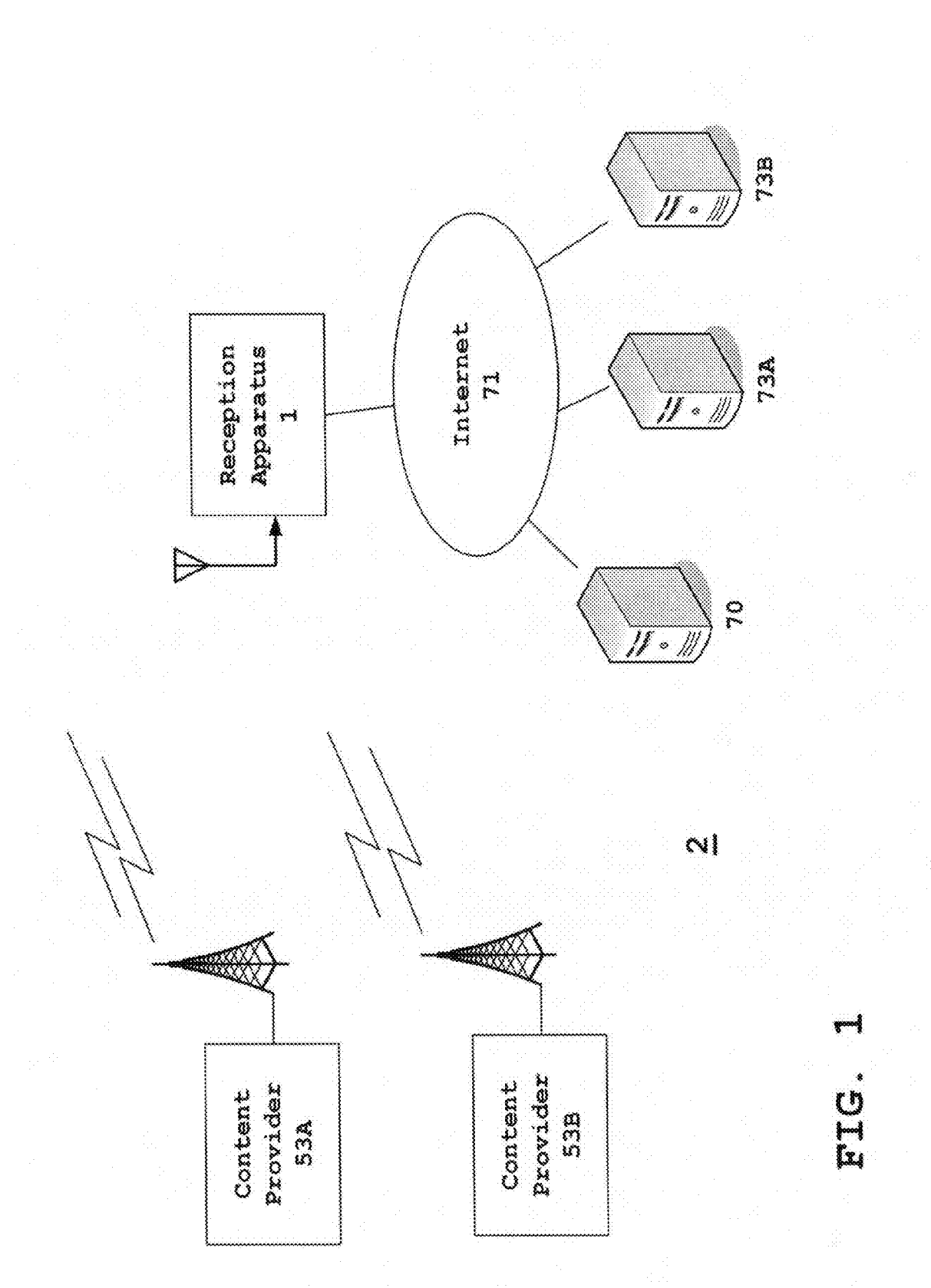
FIG. 1 shows an exemplary broadcast system.

While the present disclosure is susceptible of embodiment in many different forms, there is shown in the drawings and will herein be described in detail specific embodiments, with the understanding that the present disclosure of such embodiments is to be considered as an example of the principles and not intended to limit the present disclosure to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a program module, a script, a function, a procedure, an object method, an object implementation, in an executable application, an applet, a servlet, a source code, an object code, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio/video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an EPG.

Reference throughout this document to "one embodiment," "certain embodiments," "an embodiment," "an implementation," "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

There are certain aspects of operation of the traditional terrestrial broadcast system that are less than optimal. For example, the time required to perform a channel scan, for determining available channels, can be quite long (e.g., several minutes). Accessing program guide information can be a time consuming process as well, because the repetition rate of certain tables, especially those describing scheduled programming further into the future, can be long.

Further, an update to a channel map is typically not performed automatically. Such updates are typically performed only when a user asks for the channel scan to be performed. Thus changes may not be processed in the receiver in a timely fashion. In addition, whenever the channel scan is performed, the tuner must be employed, thus normal viewing or another use of the tuner, such as recording, may be impacted. Receivers not installed in a fixed location, such as those installed in vehicles or those that are portable, can also be a challenge to designers because reception conditions change and frequent and repeated channel scans can be awkward and cumbersome for the user.

Certain embodiments of the present disclosure aim to address the above-noted problems. For example, certain embodiments disclosed herein reduce the time required to complete the task of acquiring a partial or full description of digital services available to a receiver. Additionally, certain embodiments disclosed herein perform automatic (background) updates to the channel/service map without impacting viewing or recording functions in the receiver. Further, certain embodiments disclosed herein enable the receiver to obtain program guide information more quickly, even for programs scheduled to be broadcasted far into the future.

Moreover, different modulation modes may be utilized to transmit carriers associated with a virtual cannel. In the future, in a next-generation broadcast transmission system (e.g., as envisioned for the next generation broadcast system under development in the United States, called "ATSC 3.0"), certain new modulation parameters may be employed. Certain embodiments of the present disclosure provide a receiver with one or more modulation parameters, which identify the modulation mode used, prior to tuning, to reduce the time required to access a channel.

Referring now to the drawings, FIG. 1 is a block diagram that shows an exemplary broadcast system 2, including a plurality of content (or service) providers 53A, 53B, a reception apparatus 1, a primary server 70, and a plurality of secondary servers 73A, 73B. The reception apparatus 1 accesses the primary server 70 and/or the plurality of secondary servers 73A, 73B via a communication network, for example, the Internet 71.

In one embodiment, the primary server 70 is managed, for example, by a government authority that manages a particular region's wireless spectrum (e.g., the Federal Communications Commission [FCC] in the United States). Such a server may also be referred to as a "regional server" in the present disclosure. The primary server 70 stores terrestrial broadcast channel information for one or more predetermined geographical regions (e.g., all or part of the licensed terrestrial broadcast channels of a country). The terrestrial broadcast channel information includes, for each broadcaster associated with a predetermined geographical region, one or a combination of a broadcast channel, the geographical area encompassed by a signal associated with that broadcast license, and a location (e.g., URL) of a broadcaster local server (BLS, e.g., secondary server 73A or 73B) associated with, or otherwise operated by, the respective broadcaster.

In one embodiment, a separate secondary server (e.g., secondary servers 73A, 73B) is provided by, or otherwise associated with, each licensed broadcast station owner, and are referred to as BLSs. The URL for each of the BLSs is available within metadata provided by the primary server 70.

Note that, for the purposes of the present disclosure, a "broadcaster" could be considered to be the provider of television services within a certain geographic service area, even if that entity does not operate a physical transmitter. The television services offered by that "broadcaster" could be provided by one or more Internet servers operated by that entity. The system described herein associates that service provider with receivers inside a certain geographic area. This can be helpful for content licensing purposes, and to ensure that local advertising reaches only receivers in the local area served by that operator. Such an embodiment could be used for example in conjunction with authentication described below in which case a receiver's location can be verified and certain content can be enabled for reception.

In certain embodiments, the primary server 70 provides one or more files containing broadcast license data (BLD) records. The BLD records are an example of terrestrial broadcast channel information. Each record corresponds to one broadcast license. The broadcast license corresponds to one physical transmission frequency in a certain geographic area. Each BLD record includes, but is not limited to, the call letters of the broadcaster, the physical transmission frequency of the broadcaster's transmitter, and a location (e.g., URL) of an associated secondary server (e.g., secondary server 73A or 73B). The secondary server may also be referred to as a BLS in the present disclosure. Such secondary servers are servers managed by or otherwise associated with terrestrial broadcasters.

It is noted that in case of advanced physical transmission systems, some additional parameters may be included in addition to the frequency. Such additional parameters may be added as required to assist the reception apparatus 1 in quickly accessing the transmission multiplex. Exemplary parameters include identification of an error correcting coding layer, modulation modes (e.g., DVB-T2), which portions of the broadcast stream correspond to which services, etc.

FIG. 6 shows exemplary contents of a Broadcast License Data (BLD) file for zip code 98072 in the State of Washington according to certain embodiments of the present disclosure. As illustrated in FIG. 6, the BLD file includes the call letters, RF channel, and a secondary server URL for each broadcaster included in the BLD file, which in this case are the broadcasters that broadcast content and/or services that might be receivable by receivers located somewhere within the area of zip code 98072. In another embodiment, the BLD file includes the RF channel and/or a secondary server URL for each broadcaster, but does not include call letters.

In certain embodiments, a BLD record may further include the service area of the broadcaster's transmission signal. When the service area of the broadcaster's transmission signal is included, the service area may be represented in a variety of ways, for example, as a list of coordinates representing points on a closed curve, where the curve delimits the boundary of the service area, or a list of zip codes or postal codes corresponding to areas that are completely or partially contained within the service area. The service area may be represented as the union of one or more geographic areas, each of which could be a circle or polygon. The service area may be represented as a list of county codes corresponding to areas that are completely or partially contained within the service area. The service area may be represented as a list of city codes corresponding to areas that are completely or partially contained within the service area. The service area may also be represented by any combination of the above-noted representations.

Depending on the type of terrestrial broadcast channel information available to the reception apparatus 1, the reception apparatus 1 may need to utilize its location information or the service area information to determine which broadcast channels are estimated to be receivable or are receivable by the reception apparatus 1. Alternatively, the reception apparatus 1 submits its location information to the primary server 70, which determines which broadcast channels are estimated to be receivable or are receivable by the reception apparatus 1.

The BLD records may be organized in a number of different ways. For example, the BLD records for the entire country are provided within one file and each record includes a service area. Alternatively, BLD files are organized by states/regions and each record includes a service area. In this case, the reception apparatus 1, knowing the code for the state/region in which the reception apparatus 1 resides, downloads the BLD file associated with that state/region. The data within each file may include data associated with broadcasters in nearby states as well, because a reception apparatus 1 near the state border may access broadcast signals across the state line.

In another example, as mentioned, the BLD records are organized by zip code. Each file contains all or part of the broadcasters whose signals may potentially be received by receivers located within a particular zip code. For example, each file includes BLD records corresponding to broadcasters whose service area intersects all or a portion of the zip or postal code of that file. Thus, a receiver known to be located in a particular zip or postal code area can be expected to receive all or a portion of the broadcast signals listed, and no others. The BLD records may also be organized by state and county code in a similar fashion. In the case of zip codes, a broadcaster may be required to report which zip codes receive its broadcasts. Alternatively, this determination may be made by the managing authority.

In another example, the BLD records are organized by latitude/longitude coordinates. In this case, the approximate latitude and longitude of a location of the reception apparatus 1 is determined. Such determination may be performed by translation from the residential address or via a Global Positioning System (GPS) function available to the receiver. Furthermore, an approximate or exact location of the receiver may be determined using the Internet Protocol address (IP address) of the reception apparatus 1, in conjunction with information provided by the Internet service provider (ISP).

An exemplary detailed BLD record available from the FCC is illustrated in FIG. 7B. As illustrated in FIG. 7B, the record includes a call sign (i.e., KCTS-TV) and an RF channel. However, the record does not include a secondary server URL. Thus, in one embodiment, the BLD record is modified to further include secondary server location information. In another embodiment, the primary and second servers are combined such that the secondary server location information is not needed. The BLD record illustrated in FIG. 7B is further discussed below. The BLD record may also be modified to include any other terrestrial broadcast channel or service information that is not currently included in the BLD record.

The secondary servers 73A, 73B are servers managed by the content providers 53A, 53B, respectively. The secondary servers 73A, 73B are configured to provide service information to the reception apparatus 1. In one embodiment, the service information is service description data (SDD), for example, in the form of service files.

For example, the SDD associated with a particular broadcaster includes one or a combination of a broadcast frequency; a description of one or more modulation modes employed by the broadcaster within the referenced transmission (e.g. PHY layer data); metadata describing the transmission multiplex, including transport-related parameters such as transmission signal ID; a description of the service offerings available within the broadcast multiplex (e.g., analogous to the VCT specified in ATSC A/65 Program and System Information Protocol [PSIP]); program guide data; description of Internet-related services offered by the broadcaster, such as non-real time (NRT) and streaming services; URLs for each program in the broadcaster's schedule (e.g., for each channel, when multiple channels are provided in the broadcast multiplex), where each URL may point to a location of interactive content associated with the given program; and a pointer to a website where the viewer is able to sign up for a service, such as subscription to pay-per-view or subscription-based service and content offerings. ATSC standard A/65 is incorporated herein by reference in its entirety.

In certain embodiments, the SDD includes a portion or all of the broadcast channel metadata. For example, the SDD includes one or a combination of a broadcast channel, one or more modulation modes, metadata describing a broadcast multiplex carried on the broadcast channel, a description of one or more services available within the broadcast multiplex, and program guide data associated with a respective content provider.

In one embodiment, the service files have the same content as the data provided in the broadcast signal but may be provided via the Internet in the form of XML files (e.g., PSIP data represented in XML format), compressed XML, or similar. Other formats are possible including binary formats. Note that an XML representation of PSIP data is defined in the Programming Metadata Communication Protocol Standard defined in ATSC standard A/76, which is incorporated herein by reference in its entirety.

Each of the content providers 53A, 53B includes a transmission apparatus with a transmitter that is configured to transmit one or more content items and/or services to the reception apparatus 1. In other embodiments, the transmission apparatus may be shared by a plurality of different content providers.

In certain embodiments, each content or service is associated with a virtual channel, and is received by the reception apparatus 1 via a first communication interface (e.g., a digital television tuner). The reception apparatus 1 is configured to receive the content and/or services from the content providers 53A, 53B via, for example, a terrestrial broadcast.

The content providers 53A, 53B, in other embodiments, provide the content via, at least, one of a satellite broadcast, a cable television transmission, a terrestrial television broadcast, cellular network, and data communication network, for example, a local area network (LAN), wide area network (WAN), or the Internet 71. The connection to the local area network (LAN), the wide area network (WAN), or the Internet 71 may be wired or wireless.

The content provided by each of the content providers 53A, 53B includes, for example, one or more television programs, without regard to whether the content is a movie, sporting event, segment of a multi-part series, news broadcast, etc. Further, the content provided by each of the content provider 53A, 53B may also include advertisements, infomercials, and other program-like content which may not be reported as a program in an electronic program guide (EPG). The services can include but are not limited to linear TV services, non-real-time content, interactive elements associated with regular ("linear") television programming, web-based content, and streaming audio/video services available via Internet servers.

Figure 10:
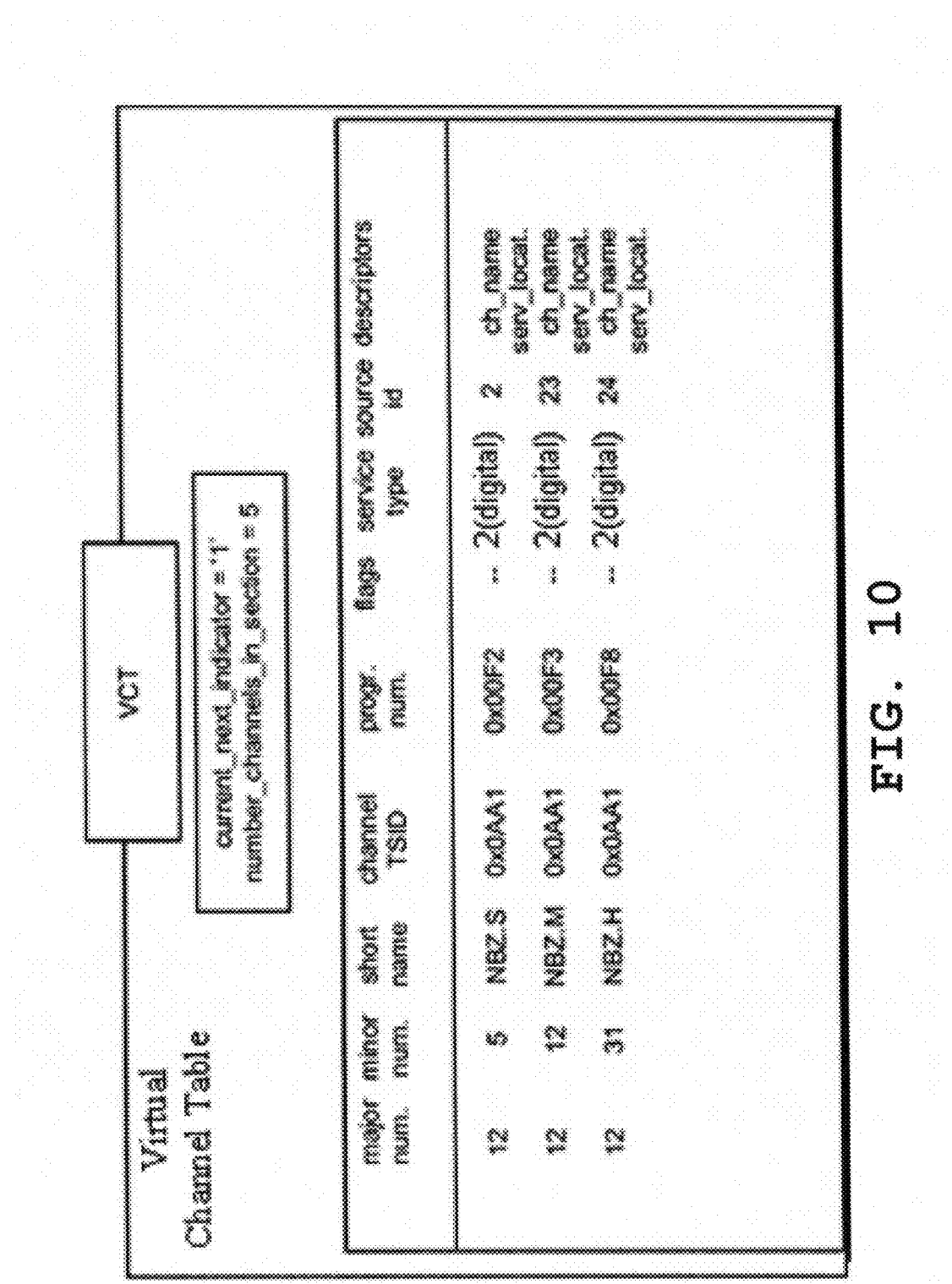
FIG. 10 illustrates an exemplary virtual channel table.

The reception apparatus 1 uses a virtual channel table (VCT) to tune to the content and/or service provided by each of the content providers 53A, 53B. An exemplary VCT is illustrated in FIG. 10.

In telecommunications, a virtual channel is a channel designation which may differ from the actual physical transmission channel or frequency on which a transport stream (TS) is modulated. The term is often applied in the television environment, where several Digital Television (DTV) channels may be present within a single 6 MHz physical channel. For example, a station branded as Channel 8 might actually use RF channel 32 for its transmitted signal, but a VCT allows viewers to "tune in" the station on channel 8 on a digital television. The virtual channel entry in the VCT thus enables viewers to select the station by choosing the same channel number even in such cases where the broadcaster's physical transmission frequency may be changed for some reason (as when "spectrum repacking" occurs). The VCT accomplishes this by using defined parameters to link a channel number to content received from a terrestrial broadcast, cable television transmission, satellite broadcast, etc. These defined parameters may include the major channel number, minor channel number, short name, service type, one or more descriptors, etc.

In one embodiment, the VCT is in accordance with the Advanced Television Systems Committee (ATSC) VCT defined by ATSC A/65 Program and System Information Protocol (PSIP). An exemplary VCT is described in U.S. patent application Ser. No. 13/562,946, which is incorporated herein by reference in its entirety.

It should be noted that a broadcast channel associated with the virtual channel can include metadata such as channel descriptions and program guide data. In some embodiments, the channel is associated with electronic program guide data delivered via the A/65 Event Information Table (EIT), an Extended Text Table (ETT), or other means. In one embodiment, the metadata for a broadcast channel includes PSIP data included in a TS to be transmitted via terrestrial broadcast. The data includes one or a combination of (1) a Terrestrial Virtual Channel Table (TVCT) defining, for example, MPEG-2 program embedded in the TS in which the TVCT is carried; (2) a Master Guide Table (MGT) defining the type, packet identifiers, and versions for all the other PSIP tables in the TS, except for the System Time Table (STT); (3) a Rating Region Table (RRT) defining the TV parental guideline (rating information) system referenced by any content advisory descriptor carried within the TS; and (4) a System Time Table (STT), defining a current date and time of day.

As described above, one or any combination of the preceding metadata may be included in the service information. In a further embodiment, one or any combination of the preceding metadata may, alternatively or additionally, be included in the terrestrial broadcast channel information.

The Internet 71 is accessed by the reception apparatus 1 to connect to at least one of the primary server 70, secondary server 73A, and secondary server 73B to access, for example, channel and/or service information.

Figure 2:
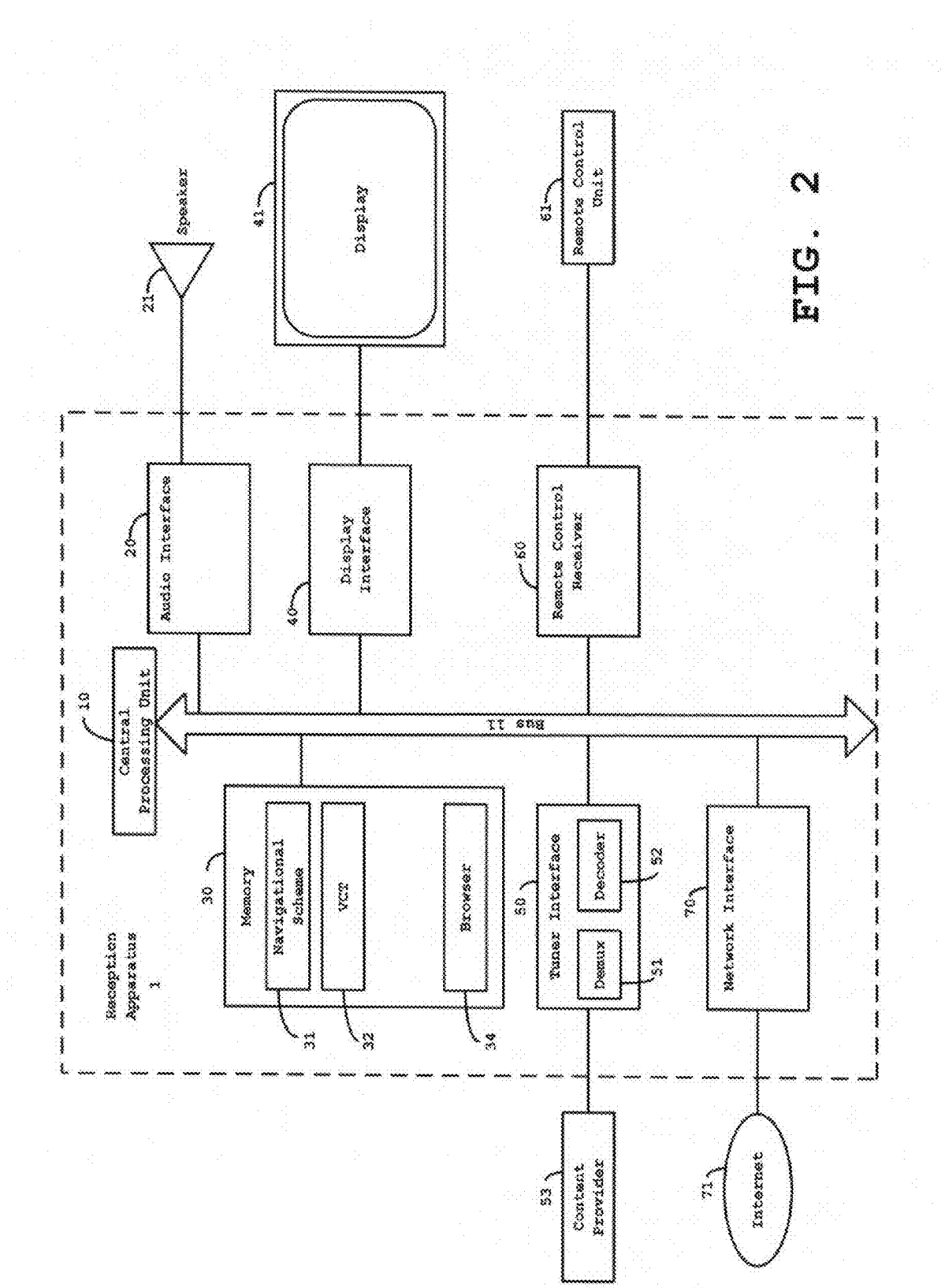
FIG. 2 is a block diagram of an exemplary reception apparatus.

FIG. 2 is a block diagram of an exemplary reception apparatus 1. The reception apparatus 1 is a home video processor such as a personal computer or a television receiver, or an information processor such as a Personal Digital Assistant (PDA), smartphone, tablet computer, home or portable music player, or home or portable gaming machine. Further, the reception apparatus 1 may be a standalone device or incorporated, for example, in a television set or other consumer electronics device. For example, in one embodiment, the reception apparatus 1 is a digital television receiver device that may be incorporated into a television set or a set top box.

The reception apparatus 1 includes a central processing unit (CPU) 10, a memory 30, an audio interface 20, a display interface 40, a remote control receiver 60, a tuner interface 50 (e.g., a first communication interface), and a network interface 70 (e.g., a second communication interface).

Data is communicated via one or more buses 11. Audio and/or video streams that have been decoded by the tuner interface 50 are retrieved. The decoded audio stream is sent to the audio interface 20 and the decoded video stream is sent to the display interface 40. The CPU 10 also receives data from and sends data to the Internet 71 via the network interface 70. Further, the CPU 10 executes commands received by the remote control receiver 60. These commands can be in the form of a direct channel entry through the keypad of the remote control unit 61 or inputs from the remote control unit 61 using an on-screen channel guide.

The memory 30 stores the data used by the reception apparatus 1. The memory 30 within the reception apparatus 1 can be implemented using disc storage form as well as other forms of storage such as non-transitory storage devices including for example network memory devices, magnetic storage elements, magneto-optical storage elements, flash memory, core memory and/or other non-volatile storage technologies. It should be noted that the use of the term "non-transitory" is a limitation on the medium itself (i.e., tangible, not a signal) as opposed to a limitation on data storage persistency (i.e., RAM vs. ROM).

The memory 30 can provide for NRT or Internet-delivered content such as Internet Protocol Television (IPTV). The memory stores a navigational scheme 31 which provides, for example, the on-screen channel guide or an electronic programming guide (EPG), that allows the user to select desired content accessible via one or more communication interfaces to content sources such as a television broadcast and the Internet.

A VCT provides a channel map for the CPU 10 to determine what content received by the tuner interface 50 corresponds to a user selected virtual channel entered via the remote control unit 61 or the navigational scheme 31.

The tuner interface 50 receives content and/or a service provided through any suitable delivery source such as a terrestrial broadcast, cable transmission, satellite broadcast, or the Internet. The content and/or service is provided by one or more content providers. In one embodiment, the content and/or service is contained in a TS that includes one or more of channel data, VCT data, etc. The TS is received at the tuner interface 50 and is demultiplexed at demultiplexer 51 into audio, video, and/or data streams. The audio and/or video streams are decoded at decoder 52 within the tuner interface 50. Data streams from the content provider 53 contain information such as VCT data corresponding to the channels provided by the content provider 53. This data provided by the content provider 53 is placed in the VCT 32 within the reception apparatus memory 30 via the CPU 10. In certain embodiments, the VCT data is acquired from one or more secondary servers instead of the TS.

The reception apparatus 1 generally operates under control of a processor such as CPU 10 which may be interconnected to any one or a combination of a memory 30, an audio interface 20, display interface 40, and remote control receiver 60 via one or more buses 11. When the TS is demultiplexed at the demultiplexer 51, audio and video data are sent to the decoder for decoding and sent to the audio interface 20 and display interface 40, respectively. In addition to the audio and video data, the demultiplexer also receives VCT data updated by the content provider 53 to the VCT 32 in the memory 30. In certain embodiments, the VCT data is updated using the one or more secondary servers instead of the TS.

In one embodiment, the data in the VCT 32 is then used to update the navigational scheme 31 available to the user with the respective content available from the TS provided by the content provider 53. In addition to the content available from the content provider 53, the user can also access the Internet 71 through a network interface 70 with Internet content being generated and displayed via a browser 34 or another appropriate application or player located in the memory 30.

When the user enters a channel number using the remote control unit 61 or selects a channel number via the navigational scheme 31, as presented on the display 41, the CPU 10 will receive the desired virtual channel number and access the VCT 32 in order to determine if there is a corresponding entry. If a match is found, then the CPU 10 will instruct the tuner interface to tune to the selected physical transmission channel and present the content associated with the channel via the display interface 40 and audio interface 20, which are connected to the display 41 and a speaker 21, respectively.

Figure 3:
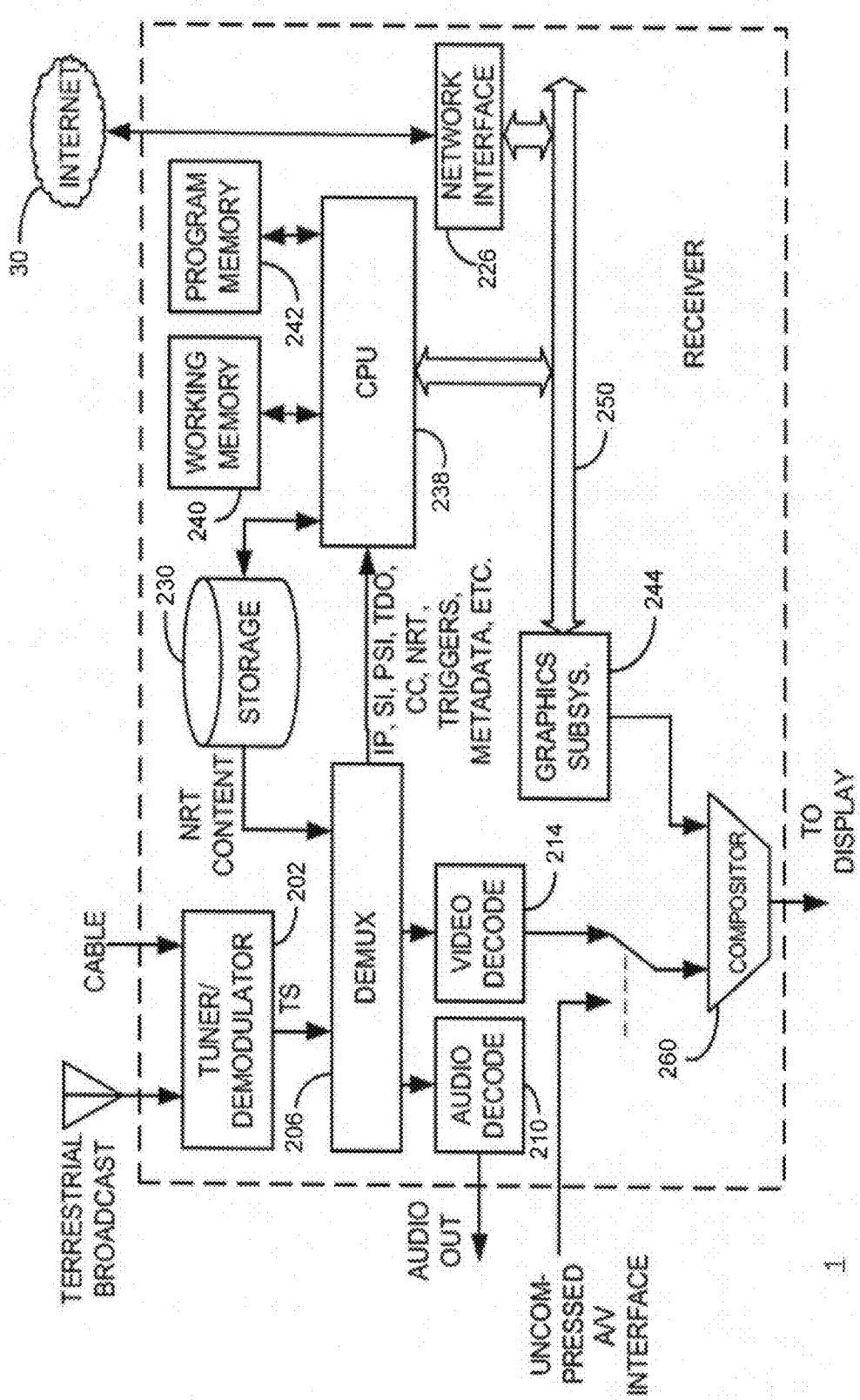
FIG. 3 is another block diagram of an exemplary reception apparatus.

FIG. 3 illustrates an embodiment of the hardware components of the reception apparatus 1. The reception apparatus 1 includes a tuner/demodulator 202, which receives content and/or a service from one or more content sources such as a terrestrial broadcast or a cable television transmission. The reception apparatus 1 may also, or alternatively, receive content from a satellite broadcast.

The tuner/demodulator 202 receives a TS, which is demultiplexed by the demultiplexer 206 into audio and video (A/V) streams. The audio is decoded by an audio decoder 210 and the video is decoded by a video decoder 214. Further, uncompressed A/V data may be received via an uncompressed A/V interface (e.g., a HDMI interface) that can be selectively utilized.

In one embodiment, the TS includes ancillary information such as one or more of caption data, PSIP data, various tables, etc. However, in other embodiments, the A/V content and/or a subset or all of the ancillary information may be received via the Internet 30 and a network interface 226.

A storage memory 230 is provided to store NRT or Internet-delivered content such as Internet Protocol Television (IPTV). The stored content can be played by demultiplexing the content stored in the storage memory 230 by the demultiplexer 206 in a manner similar to that of other sources of content.

The reception apparatus 1 generally operates under control of at least one processor, such as CPU 238, which is coupled to a working memory 240, program memory 242, and a graphics subsystem 244 via one or more buses (e.g., bus 250). The CPU 238 receives closed caption data from the demultiplexer 206 as well as any other information such as EPGs used for rendering graphics, and passes the information to the graphics subsystem 244. The graphics outputted by the graphics subsystem 244 are combined with video images by the compositor and video interface (compositor) 260 to produce an output suitable for display on a video display.

Further, the CPU 238 operates to carry out functions of the reception apparatus 20 including the processing of terrestrial broadcast channel information, service information, determining broadcast channels that are estimated to be receivable, identification of available channels and/or services, generating a list of available channels and/or services, processes for generating the VCT or other channel data, and/or browser operations. The browser operations, in one embodiment, include accessing the primary server 70 and/or secondary servers 73A, 73B to acquire channel and/or service information to facilitate the identification of the available channels and/or services. The processing of the terrestrial broadcast channel and service information may include extracting predetermined parameters of interest.

Although certain embodiments of the present disclosure are described using a VCT as an example of a list of available channels and/or services, it should be noted that the present disclosure is not so limited. Other embodiments include, for example, the generation of a more simplified list of candidate or available channels and/or services or other channel map or data structures. An example of another data structure that describes a list of available services is the Service Map Table (SMT) defined in ATSC A/153 Part 3, Section 7.3. ATSC A/153 is incorporated herein by reference in its entirety.

In television standards under development, more complex service offerings beyond simple audio/video ("linear" television service) are anticipated. These more complex offerings may combine broadcast audio/video/data sources with service components delivered by broadband paths (e.g., the Internet). The characteristics of these more complex services can be delivered in the SDD, in a suitable structure that might be considered to be an extension of the current A/65 VCT.

Figure 4:
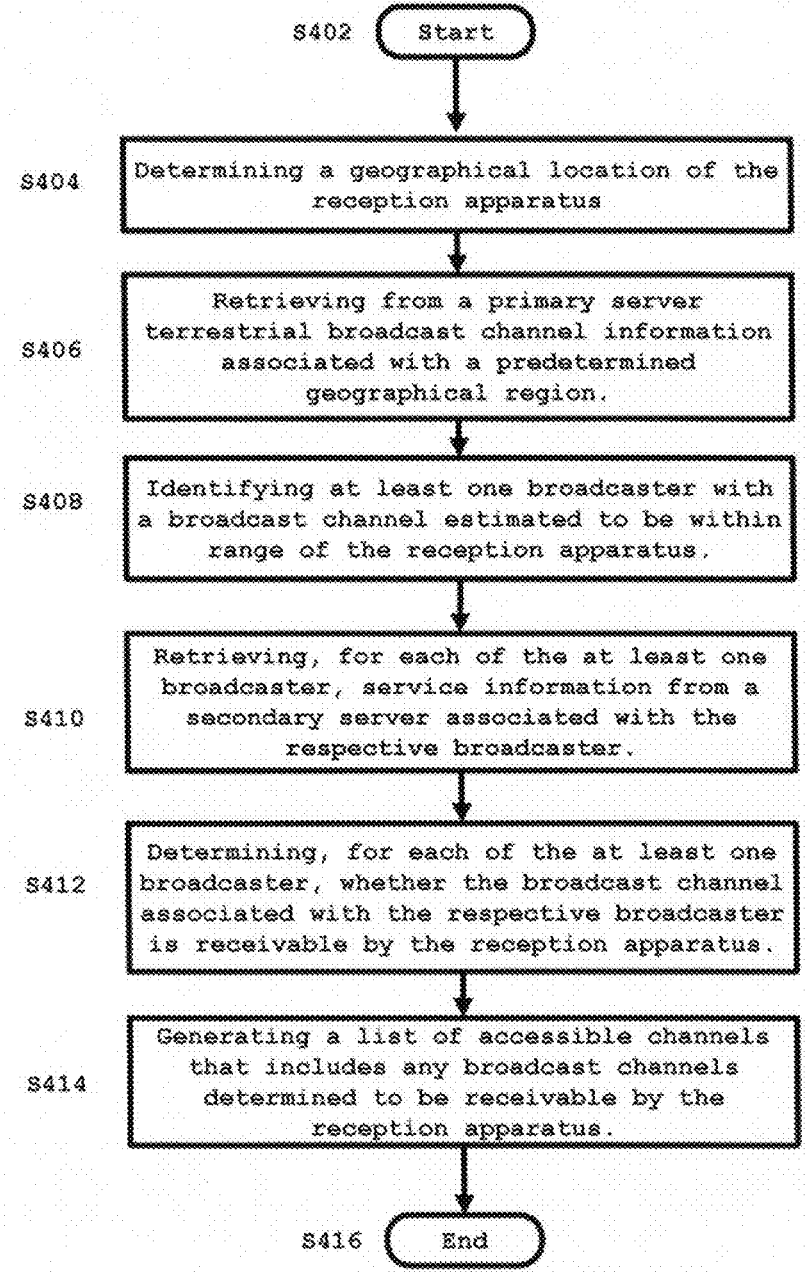
FIG. 4 is a block diagram of a method for generating a list of accessible channels.

FIG. 4 is a flow diagram of an exemplary method for generating a list of accessible channels (e.g., a VCT) in the reception apparatus 1. At step S402, the reception apparatus 1 starts the list generation process. The list generation process is started for example during an initial setup of the reception apparatus 1 or in response to a request by a user of the reception apparatus 1 to search for accessible channels. In the case of a mobile receiver, the list generation process may be started based on changes in receiver location or loss of a currently tuned signal.

Further, in step S402, the reception apparatus 1 optionally performs one or more initialization processes. For example, the reception apparatus 1 checks whether or not a geographical location of the reception apparatus 1 has changed. The reception apparatus 1 performs this check by, for example, checking GPS coordinates if available. In one embodiment, when broadcast signals from one or more listed channels that had previously been acquired can no longer be acquired, the reception apparatus determines that the geographical location of the reception apparatus has changed.

Additionally, the reception apparatus 1 may check the list of the channels stored in a memory of the reception apparatus. For example, the reception apparatus 1 determines whether a previously generated VCT is available in which the generation process may take into account the preexisting list. The Internet/network connection of the reception apparatus 1 may also be checked by the reception apparatus 1.

At step S404, the reception apparatus 1 optionally determines a geographical location of the reception apparatus 1. As described above, such a determination may be performed by translation from a residential address or via a GPS function available to the reception apparatus 1. Furthermore, an approximate or exact location of the receiver may be determined using the IP address of the reception apparatus 1, in conjunction with information provided by the ISP. In one embodiment, the reception apparatus 1 selects the appropriate geographical region from a displayed list. In another embodiment, the location is manually entered by the user of the reception apparatus 1 (e.g., a home address, zip code, etc.). It is noted that similar methods for the location of an electronic device may be used as the scope of the current disclosure is independent of how the location of the reception apparatus is determined.

At step S406, the reception apparatus 1 retrieves terrestrial broadcast channel information (e.g., one or more BLD records) from the primary server 70. The reception apparatus 1 retrieves a location (e.g., URL address) of a regional server (e.g., primary server 70) from a memory of the reception apparatus 1.

In one embodiment, the reception apparatus 1 accesses the primary server 70 based on the country in which the reception apparatus 1 is operating. The country information may be automatically determined or inputted by the user.

As described above, the location (e.g., URL) of the regional server for each region may be provided in advance. For example, in an exemplary embodiment, the URL of the regional server (e.g., U.S., Canada, U.K, etc.) may be built or preprogrammed into memory of receivers during the manufacturing process. Alternatively, a user may enter the URL for the regional server manually. Alternatively, the location of the regional server may be obtained from the manufacturer's server.

The reception apparatus 1 uses the URL address to access the primary server 70 and retrieve terrestrial broadcast channel information associated with a predetermined geographical region. The predetermined geographical region may correspond to a country or may be determined based on the geographical location of the reception apparatus 1. In one embodiment, the reception apparatus 1 obtains terrestrial broadcast channel information associated with a predetermined geographical region (e.g., a country) and locally filters the obtained predetermined geographical region based on the geographical location of the reception apparatus 1. In other embodiments, the filtering is performed by the primary server 70.

Examples of the geographical region include, but are not limited to, a continent, a country, a state, a city, a zip or postal code, or any similar geographical area. Such information may include, for example, information regarding the broadcasters operating in the geographical regions such as one or a combination of call sign, broadcast frequency, virtual channel information, and broadcaster server location, as described above.

The reception apparatus 1 then downloads a full database file, or accesses a pre-filtered file based on, for example, zip code, state code, county code, or similar information. As described above, the reception apparatus 1 may have a user setup menu in which zip code and/or state information is entered. When downloading a filtered file, the reception apparatus 1 optionally uses the geographical location of the reception apparatus 1 determined at step S404.

At step S408, the reception apparatus 1 identifies at least one broadcaster with a broadcast channel that is estimated to be within range of the reception apparatus 1. For example, the reception apparatus 1 processes the data in the file downloaded at step S406 to determine which broadcasters are operating potentially within its range of reception and which broadcasters are too far away (i.e., no chance of reception) and can be disregarded.

In another embodiment, processing of the downloaded file is skipped and the at least one broadcaster includes all broadcasters in the terrestrial broadcast channel information.

At step S410, the reception apparatus 1 retrieves, for each of the at least one broadcaster, service information (e.g., SDD) from a secondary server associated with the respective broadcaster. For example, the reception apparatus 1 uses the URL associated with a BLS to download the SDD associated with that broadcaster. In another embodiment, the reception apparatus 1 downloads the service information from the primary server 70 or from any other predetermined location.

At step S412, the reception apparatus 1 determines, for each of the at least one broadcaster, whether the broadcast channel associated with the respective broadcaster is receivable by the reception apparatus 1. For example, using the SDD, the reception apparatus 1 identifies the physical transmission frequency and modulation parameter(s) (when applicable), and then tunes to (and attempts to acquire the broadcast signal on) the designated broadcast channel.

For example, for each broadcast channel, the reception apparatus 1 determines whether a characteristic of the terrestrial broadcast signal carried on the respective broadcast channel is greater than or equal to a predetermined threshold. Exemplary characteristics include success or failure to lock to the digital carrier, signal level (e.g., as illustrated in FIG. 8), signal-to-noise ratio, data error rate, etc.

At step S414, the reception apparatus 1 generates a list of accessible channels that includes any broadcast channels determined to be receivable by the reception apparatus 1. For example, if acquisition of a broadcast signal is successful, the broadcast channel listed in the SDD is added to the list of accessible channels, and the services listed in the SDD are added to the list (e.g., in a VCT). If acquisition fails, the SDD may be saved, but the channels and other data are not presented to the user. Any broadcaster channel information included in the SDD, or extracted from the broadcast channel, may also be added to the list of accessible channels. For example, data not available from the SDD is extracted from the broadcast channel.

Note that the process of determining whether or not a viable signal is present at a given carrier frequency can be performed relatively quickly. Because the service information, including potentially very detailed program guide information, has already been provided in the SDD, the scanning process can proceed without waiting for that same information to be made available in the broadcast, thereby optimizing the setup process. While the same SDD information may be available in the broadcast emission, due to the bandwidth allocated to it and the repetition rate of the tables, a receiver may need to wait a significant amount of time to retrieve all of it.

At step S416, the process is completed. In one embodiment, steps S412, S414 are performed separately for each broadcaster (or broadcast channel). In this case, steps S412, S414, and optionally S410, are performed on a per broadcaster basis and repeated until all broadcast channels have been visited. In another embodiment, one or more of the steps S410, S412, S414 is performed for all broadcasters before advancing to a subsequent step. In yet another embodiment, these steps may be performed in parallel: access to the secondary servers (i.e., the SDD servers) may be made while at the same time the tuning to the potential services is handled.

In certain embodiments, the reception apparatus 1 omits step S410. In this case, the reception apparatus 1 performs the determination in step S412 based on broadcast channel information (e.g., the RF channel) identified in the service information. For example, the reception apparatus 1 omits step S410 for one or more broadcasters when the reception apparatus 1 does not have access to the Internet 71, a secondary server is not otherwise accessible by the reception apparatus 1, or the location of the secondary server information is not included in the terrestrial broadcast channel information.

Figure 5:
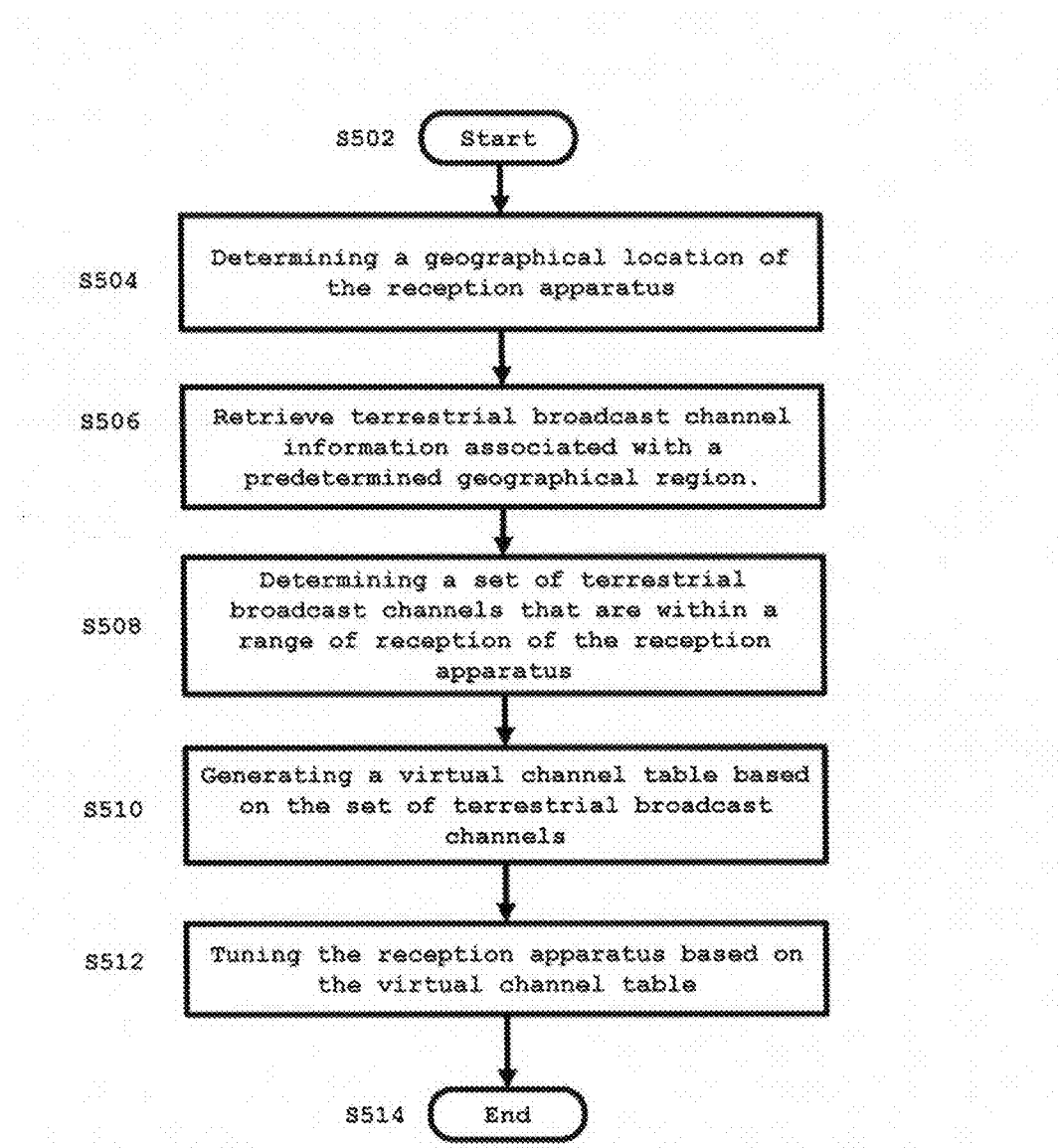
FIG. 5 is a block diagram of another method for generating a list of accessible channels.

FIG. 5 is a flow diagram of another method for generating a list of accessible channels (e.g., a VCT). At step S502, the reception apparatus 1 starts the list generation process in a manner similar to step S402. Steps S504, S506 are analogous to steps S404, S406. At step S508, the reception apparatus 1 determines a set of terrestrial broadcast channels that are within a range of reception of the reception apparatus 1. For example, the reception apparatus 1 makes the determination in a manner similar to step S408. Alternatively, the reception apparatus 1 determines that all terrestrial broadcast channels included in the terrestrial broadcast channel information are initially within range.

At step S510, the reception apparatus 1 generates the VCT based on the set of terrestrial broadcast channels. For example, the reception apparatus generates the VCT by sequentially tuning to each of the broadcast channels in the set to determine whether a digital televisions signal can be acquired. Alternatively, the reception apparatus 1 initially includes all the broadcast channels in the set in the VCT and performs testing, and removal if necessary, at the time the channel is first tuned to by a user.

In one embodiment, the VCT is generated in accordance with ATSC standard A/65 and populated with data acquired when each broadcast channel is tuned to determine whether a broadcast signal is receivable. In other embodiments, a portion or all of the VCT is generated from data acquired from at least one of the primary and secondary servers.

At step S512, the reception apparatus 1 uses the generated VCT to tune the reception apparatus 1 without searching or scanning the frequencies for different channels. In another embodiment, the broadcast channels listed in the VCT are tuned to acquire any information that may be missing from the VCT. At step S514, the process is completed.

As described above, in certain embodiments, the terrestrial broadcast channel information is retrieved from a primary server 70. For example, the terrestrial broadcast channel information is retrieved from an FCC database of licensed broadcast stations in the United States. Such a database is currently accessible on the World Wide Web at the following URL address: fcc.gov/encyclopedia/tv-query-broadcast-station-search.

The FCC search page allows searching to be performed based on various parameters, such as state, call sign, application file number, city, channel range, service types (e.g., digital television, land mobile, etc.), and record types (e.g., licensed stations, pending applications, and construction permits). The reception apparatus 1 is configured to query the FCC search page using one or more appropriate parameters to retrieve terrestrial broadcast channel information and to identify relevant information using keywords for example or recognition of the data structure of any search results.

Figure 7A:
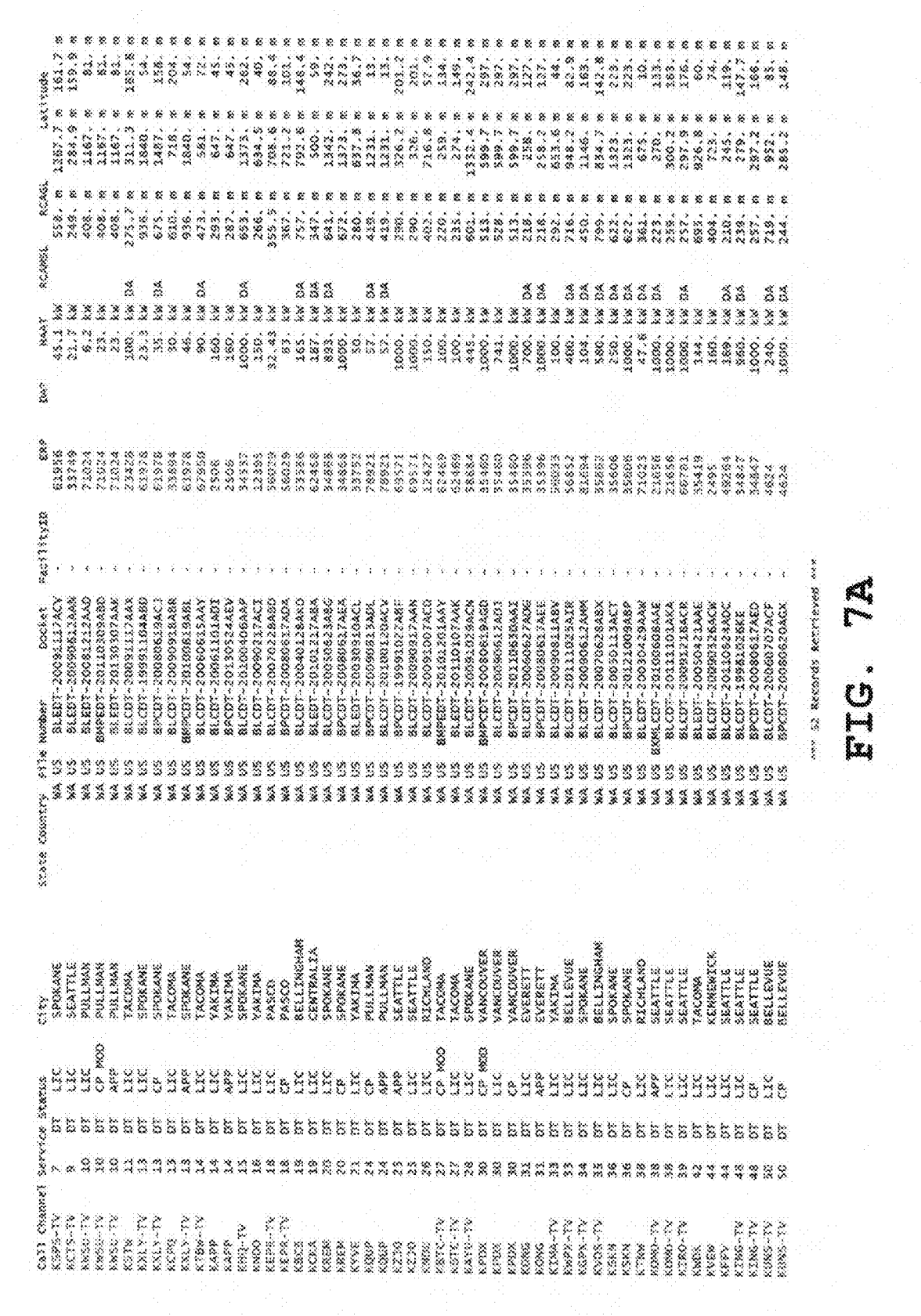

FIG. 7A shows exemplary search results for DTV stations in the state of Washington. That example may be retrieved from the World Wide Web at the following URL address: transition.fcc.gov/fcc-bin/tvq?state=WA&call=&arm= &city=&chan=&cha2=69&serv=DT&type=0&facid=&list= 2&dist=&dlat2=&mlat2=&slat2=&dlon2=&mlon2= &slon2=&size=9.

Figure 7C:
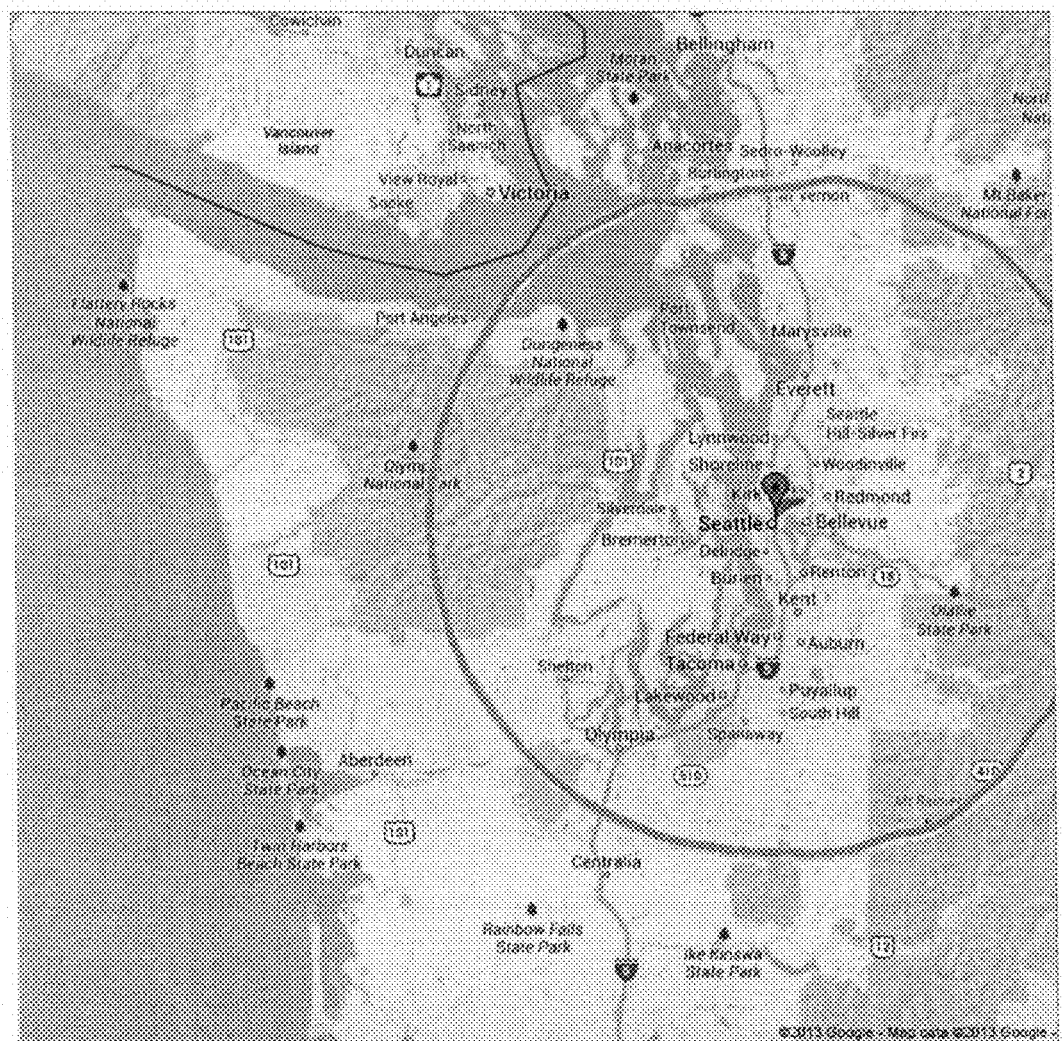
FIG. 7C shows an example of a service contour for a Digital Television (DTV) station in the state of Washington.

The database shows for example transmitter location (latitude/longitude), height above average terrain (HAAT), and transmitted power. An exemplary detailed record of KCTS-TV is illustrated in FIG. 7B. The detailed record links to additional information. For example, the detailed record contains a link to a service contour on Google map, which results in display of the information illustrated in FIG. 7C. This map was generated by clicking on "Maps: Service Contour on Google map (36 dBu)" in the data record associated with KCTS-TV, Seattle Wash. Any of this information can be utilized by the reception apparatus 1 to determine channels that are estimated to be receivable or receivable by the reception apparatus 1.

Service contours are described in further detail on the World Wide Web at the following URL address: transition-.fcc.gov/Bureaus/MB/Databases/tv_service_contour_data/ readme.html, which is incorporated herein by reference in its entirety. For example, as described in this website, the TV service contours usually do not define the outer limit of service. A television station may still be received at locations outside (and sometimes well outside) the service contours given in these files. Thus, in certain embodiments, the reception apparatus 1 uses this information, and may increase the radius by a predetermined or customizable amount, when generating the list of accessible channels.

As described above, FIG. 8 illustrates exemplary signal levels needed for reliable DTV reception (e.g., according to ATSC standard A/53, which is incorporated herein by reference in its entirety). As illustrated in FIG. 8, the signal level needed depends on frequency. In the example, illustrated in FIG. 7C, the channel was in the 7-13 range, thus 36 dBu was used as the limit. However, other signal level limits may be utilized and may vary depending on the type of transmission scheme used to transmit the DTV signal.

Figure 9:
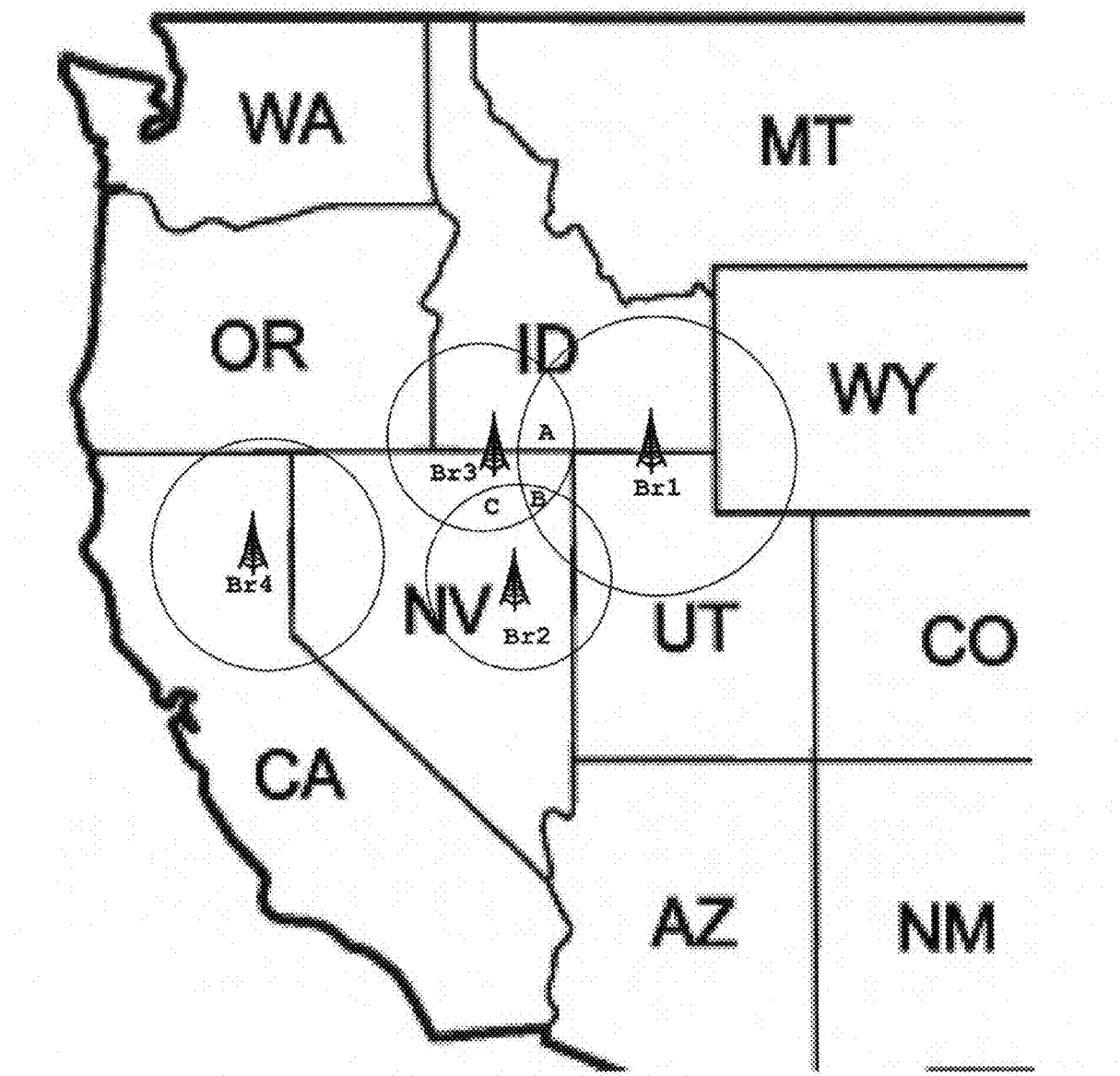
FIG. 9 is an example of service contours for a plurality of broadcasters.

FIG. 9 illustrates exemplary service contours for four broadcasters Br1-Br4. A reception apparatus 1 located in area B, as shown in FIG. 9, is within reception range for Br1-Br3 but is not in reception range of Br4. Similarly, a reception apparatus 1 located in area C is within reception range for Br2-Br3 but is not within reception range for Br1 and Br4. In this case, when a user enters the state of Nevada (NV) as a location of the reception apparatus 1, or the reception apparatus 1 detects the state of Nevada as a physical location of the reception apparatus 1, the reception apparatus 1 accesses the primary server 70 and obtains the information regarding the channels whose signals may be accessible to receivers located in NV.

Br2 and Br3 are being broadcasted in the state of Nevada. Although Br4 and Br1 are not physically located in the state of Nevada, they cover some areas in NV. Thus, in certain embodiments, the terrestrial broadcast channel information for a state or other geographical region includes broadcasters that may not be physically located in the state or other geographical region but transmit broadcast signals that are receivable by that state or other geographical region.

Figure 11:
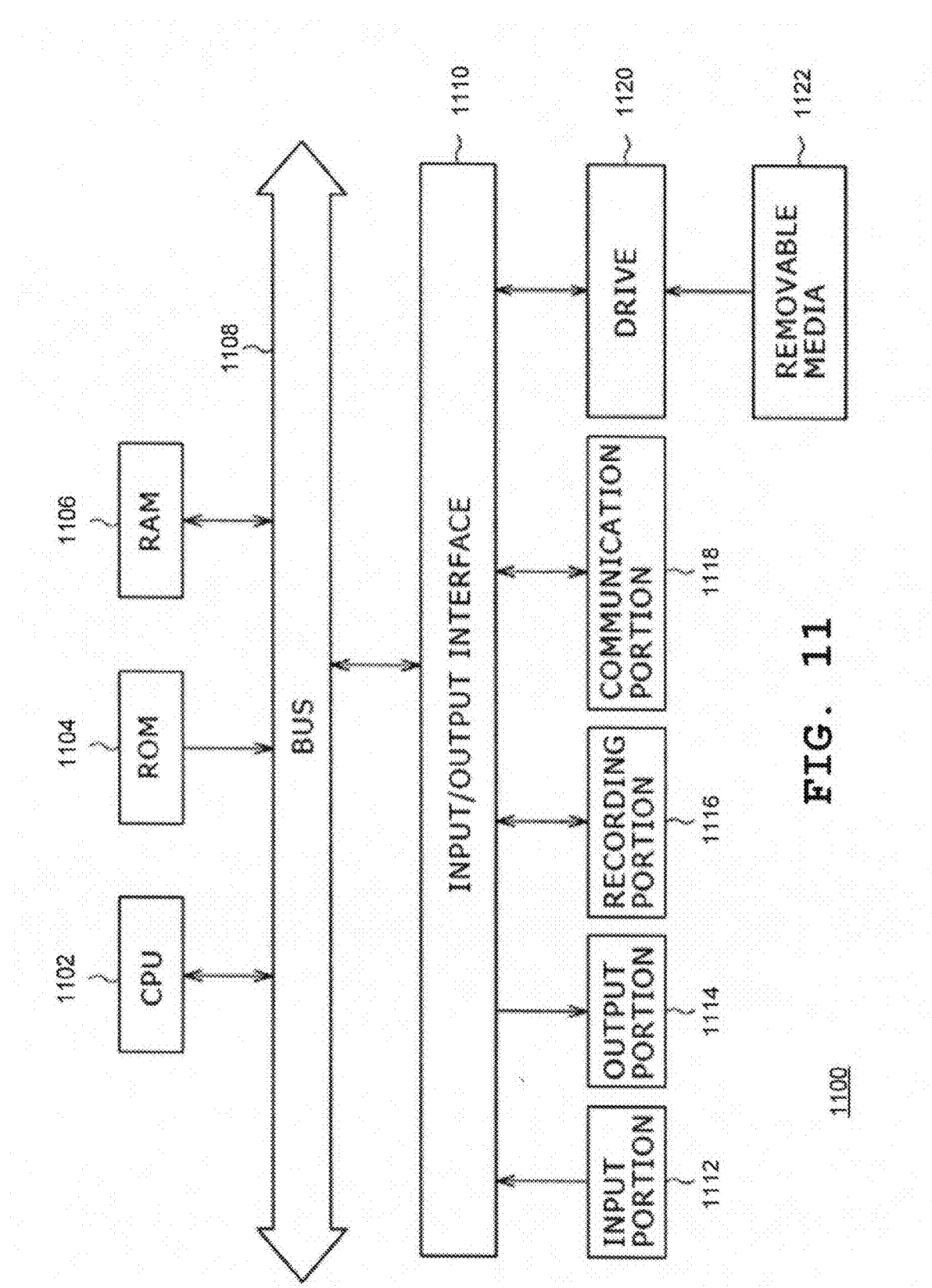
FIG. 11 shows an exemplary block diagram of a computer.

FIG. 11 is a block diagram showing an example of a hardware configuration of a computer 1100 configured to function as, or control, any one or a combination of the reception apparatus 1, content providers 53*a*, 53*b*, primary server 70, and secondary servers 73A, 73B.

As illustrated in FIG. 11, the computer 1100 includes a central processing unit (CPU) 1102, read only memory (ROM) 1104, and a random access memory (RAM) 1106 interconnected to each other via one or more buses 1108. The one or more buses 1108 is further connected with an input-output interface 1110. The input-output interface 1110 is connected with an input portion 1112 formed by a keyboard, a mouse, a microphone, remote controller, etc. The input-output interface 1110 is also connected to a output portion 1114 formed by an audio interface, video interface, display, speaker, etc.; a recording portion 1116 formed by a hard disk, a non-volatile memory, etc.; a communication portion 818 formed by a network interface, modem, USB interface, fire wire interface, etc.; and a drive 1120 for driving removable media 1122 such as a magnetic disk, an optical disk, a magneto-optical disk, a semiconductor memory, etc.

According to one embodiment, the CPU 1102 loads a program stored in the recording portion 1116 into the RAM 1106 via the input-output interface 1110 and the bus 1108, and then executes a program configured to provide the functionality, or control of the one or combination of the reception apparatus 1, content providers 53*a*, 53*b*, primary server 70, and secondary servers 73A, 73B.

Although embodiments of the present disclosure have been described using digital terrestrial broadcasts as an example, it should be noted that the present disclosure is not so limited. The embodiments described in the present disclosure could be utilized in other applications, for example to reduce the amount of time required to search for available channels and/or services provided in analog radio broadcasts, digital radio broadcasts, a CATV system, a satellite system, the Internet, etc. In one example, the Internet could replace an out of band channel (OOB) used to convey service information.

Further, as described above, a reception apparatus 1 receives terrestrial broadcast channel information (e.g., BLD) from a primary server 70 and service information (e.g., SDD) from one or more secondary servers. However, as described above, the primary and at least one of the secondary servers can be implemented by the same server. Moreover, although the terrestrial broadcast channel and service information have been described as incorporating certain data, it should be noted the terrestrial broadcast channel information can be configured to include all or a portion of any of the data defined in the service information and vice versa.

Further, as described above, a reception apparatus 1 retrieves terrestrial broadcast channel information from a primary server 70. However, in another embodiment, the service information is obtained from another source such as a portable memory or a broadcaster's TS. For example, in one embodiment, each broadcaster within a predetermined geographical area transmits service information. Thus, even when the reception apparatus 1 does not have Internet access, the reception apparatus 1 can still reduce the time required to identify available channels and/or services after performing a channel scan to identify a reduced number of broadcast channels (e.g., a single broadcast channel).

Moreover, in some cases, terrestrial broadcast channel information for a predetermined geographical area, or a list of candidate broadcast channels estimated to be receivable by the reception apparatus 1, includes multiple broadcasters associated with the same broadcast channel. In one embodiment, the reception apparatus 1 tunes to the broadcast channel first to determine which BLS to access. Alternatively, the reception apparatus 1 acquires information directly from the tuned broadcast channel information without accessing the BLS.

In certain embodiments, the reception apparatus 1 stores the locations of the BLSs associated with the broadcast channels it receives. Thus, the reception apparatus 1 can retrieve service information (e.g., program guide data or any other broadcast channel metadata) more efficiently for example as compared to extracting such information from a broadcast carousel.

Certain embodiments disclosed in the present application can be standardized, for example, by Advanced Television Systems Committee (in the standards known as "ATSC 3.0"). Therefore, all of the next-generation TV receivers deployed in US markets are in the scope of the present disclosure. Additionally, the embodiments of the present disclosure can be adapted for international use with various ATSC standards. In order to achieve the standardization, the structure and format of the BLS and BLD files may be defined as well as the protocols used to access the BLS and BLD files. Furthermore, such standardization may include development of recommended practices for broadcasters and receiver manufacturers.

The embodiments described in the present disclosure provide several advantages. For example, the reception apparatus 1 is provided with a location of an Internet-based server operated by the local broadcaster. The URL can not only provide channel and/or service information to the reception apparatus 1, but it can also provide pointers to other resources that may enhance the viewer's enjoyment of the channel. Such pointers to other resources, include, but are not limited to, interactive content associated with the channel, a questionnaire that may be used to personalize the user's experience of the channel, a pointer to the broadcaster's Internet home page, and/or a pointer to a server the reception apparatus 1 may use to report service usage information.

As another advantage, the channel map provided by the broadcaster's web-based server (e.g., the secondary servers 73A, 73B) may also include references to services available only to Internet-connected receivers. Such services may include NRT (non-real-time file-based) services, pay-per-view offerings, and streaming video services that may be seamlessly integrated with the broadcast channel map.

Further, in certain embodiments, the reception apparatus 1 is a mobile receiver. For example, in a car or recreational vehicle, or portable meaning that it is carried by the viewer. The mobile receiver may be in a vehicle that is traveling across the country. If Internet access is available before or during the trip, the database for the whole country, or several nearby states, may be downloaded beforehand to assist the reception apparatus 1 in maintaining access to a large number of DTV stations as the reception apparatus 1 is being physically moved about the country.

For example, the terrestrial broadcast channel information acquired from the primary server 70 and/or service information acquired from the secondary server 73A or 73B can be used to handle hand-offs when a mobile receiver leaves a broadcast range of a currently tuned broadcast channel. In this embodiment, the mobile receiver is configured to determine whether another broadcast channel that is related to the currently tuned broadcast channel is available based on at least one of the terrestrial broadcast channel and service information. At a minimum, the time needed to scan for channels when the mobile receiver leaves the broadcast range can be reduced.

It is also noted that the metadata describing the geographic area encompassed by the broadcaster's designated market area (DMA) may be authenticated, for example, by a signed certificate. If the physical location of the reception apparatus 1 is also authenticated, only receivers that actually reside within the boundaries of the DMA can be authorized to receive certain services.

The various processes discussed above need not be processed chronologically and/or in the sequence depicted as flowcharts; the steps may also include those processed in parallel or individually (e.g., in paralleled or object-oriented fashion).

Also, the programs may be processed by a single computer or by a plurality of computers on a distributed basis. The programs may also be transferred to a remote computer or computers for execution.

Furthermore, in this specification, the term "system" means an aggregate of a plurality of component elements (apparatuses, modules (parts), etc.). All component elements may or may not be housed in a single enclosure. Therefore, a plurality of apparatuses each housed in a separate enclosure and connected via a network are considered a system, and a single apparatus formed by a plurality of modules housed in a single enclosure are also regarded as a system.

Also, it should be understood that this technology when embodied is not limited to the above-described embodiments and that various modifications, variations and alternatives may be made of this technology so far as they are within the spirit and scope thereof.

For example, this technology may be structured for cloud computing whereby a single function is shared and processed in collaboration among a plurality of apparatuses via a network.

Also, each of the steps explained in reference to the above-described flowcharts may be executed not only by a single apparatus but also by a plurality of apparatuses in a shared manner.

Furthermore, if one step includes a plurality of processes, these processes included in the step may be performed not only by a single apparatus but also by a plurality of apparatuses in a shared manner.

Numerous modifications and variations of the present disclosure are possible in light of the above teachings. It is therefore to be understood that within the scope of the appended claims, the present disclosure may be practiced otherwise than as specifically described herein.

The above disclosure also encompasses the embodiments noted below.

(1) A method for generating a list of accessible channels in a reception apparatus, the method comprising: retrieving from a primary server, via a communication network, terrestrial broadcast channel information associated with a predetermined geographical region, the terrestrial broadcast channel information including, for each broadcaster associated with the predetermined geographical region, one or a combination of a broadcast channel and a secondary server location associated with the respective broadcaster; retrieving, for each of at least one broadcaster associated with the predetermined geographical region, service information from a secondary server associated with the respective broadcaster based on the terrestrial broadcast channel information; determining, for each of the at least one broadcaster associated with the predetermined geographical region, whether the broadcast channel associated with the respective broadcaster is receivable by the reception apparatus; and generating the list of accessible channels that includes any broadcast channels determined to be receivable by the reception apparatus.

(2) The method of feature (1), further comprises identifying the at least one broadcaster based on the terrestrial broadcast channel information and based on a geographical location of the reception apparatus, each of the at least one broadcaster being associated with a broadcast channel estimated to be receivable by the reception apparatus.

(3) The method of feature (1) or (2), in which the service information for each of the at least one broadcaster includes one or a combination of the broadcast channel, one or more modulation modes, metadata describing a broadcast multiplex carried on the broadcast channel, a description of one or more services available within the broadcast multiplex, and program guide data.

(4) The method of any of features (1) to (3), in which the broadcast channel is a digital television broadcast channel (5) The method of any of features (1) to (4), in which the step of determining comprises: tuning to each broadcast channel associated with one of the at least one broadcaster; and when the reception apparatus is tuned to the respective broadcast channel, determining whether a characteristic of a terrestrial broadcast signal carried on the respective broadcast channel is greater than or equal to a predetermined threshold value.

(6) The method of any of features (1) to (5), in which the step of retrieving from the primary server comprises retrieving the terrestrial broadcast channel information associated with the predetermined geographical region based on one or a combination of country, state, city, province, zip code, and longitude-latitude.

(7) The method of any of features (1) to (6), further comprising periodically updating the list of accessible channels based on any new broadcast channels that are determined to be receivable by the reception apparatus.

(8) The method of any of features (1) to (7), in which the reception apparatus is a mobile device.

(9) The method of any of features (1) to (8), in which the primary server is managed by a government entity that manages wireless spectrum within the predetermined geographical region.

(10) A non-transitory computer-readable storage medium storing a program which when executed by a computer, causes the computer to perform the method of any of features (1) to (9).

(11) A reception apparatus, comprising: circuitry configured to retrieve from a primary server, via a communication network, terrestrial broadcast channel information associated with a predetermined geographical region, the terrestrial broadcast channel information including, for each broadcaster associated with the predetermined geographical region, one or a combination of a broadcast channel and a secondary server location associated with the respective broadcaster, retrieve, for each of at least one broadcaster associated with the predetermined geographical region, service information from a secondary server associated with the respective broadcaster based on the terrestrial broadcast channel information, determine, for each of the at least one broadcaster associated with the predetermined geographical region, whether the broadcast channel associated with the respective broadcaster is receivable by the reception apparatus, and generate a list of accessible channels that includes any broadcast channels determined to be receivable by the reception apparatus.

(12) The reception apparatus of feature (11), in which the circuitry is further configured to identify the at least one broadcaster based on the terrestrial broadcast channel information and based on a geographical location of the reception apparatus, each of the at least one broadcaster being associated with a broadcast channel estimated to be receivable by the reception apparatus.

(13) The reception apparatus of feature (11) or (12), in which the service information for each of the at least one broadcaster includes one or a combination of the broadcast channel, one or more modulation modes, metadata describing a broadcast multiplex carried on the broadcast channel, a description of one or more services available within the broadcast multiplex, and program guide data.

(14) The reception apparatus of any of features (11) to (13), in which the broadcast channel is a digital television broadcast channel

(15) The reception apparatus of any of features (11) to (14), in which the circuitry is further configured to tune to each broadcast channel associated with one of the at least one broadcaster; and when the reception apparatus is tuned to the respective broadcast channel, determine whether the respective broadcast channel is receivable by the reception apparatus based on whether a characteristic of a terrestrial broadcast signal carried on the respective broadcast channel is greater than or equal to a predetermined threshold value.

(16) The reception apparatus of any of features (11) to (15), in which the circuitry is configured to retrieve the terrestrial broadcast channel information associated with the predetermined geographical region based on one or a combination of country, state, city, province, zip code, and longitude-latitude.

(17) The reception apparatus of any of features (11) to (16), in which the circuitry is further configured to periodically update the list of accessible channels based on any new broadcast channels that are determined to be receivable by the reception apparatus.

(18) The reception apparatus of any of features (11) to (17), in which the reception apparatus is a mobile device.

(19) The reception apparatus of any of features (11) to (17), in which the primary server is managed by a government entity that manages wireless spectrum within the predetermined geographical region.

(20) An information providing apparatus, comprising: a memory configured to store service information associated with at least one broadcaster that broadcasts a digital television signal to a reception apparatus, the service information including, for each of the at least one broadcaster, one or a combination of a broadcast channel, one or more modulation modes, metadata describing a broadcast multiplex carried on the broadcast channel, a description of one or more services available within the broadcast multiplex, and program guide; and circuitry configured to provide the service information to a reception apparatus that is configured to generate a list of accessible channels based on the service information.

The invention claimed is:

1. A method for generating a list of accessible channels in a reception apparatus, the method comprising:
    retrieving from a primary server, via a communication network, terrestrial broadcast channel information associated with a predetermined geographical region, the terrestrial broadcast channel information including, for each broadcaster associated with the predetermined geographical region, a secondary server location associated with the respective broadcaster;
    retrieving, for each of at least one broadcaster associated with the predetermined geographical region, service information via the Internet from a secondary server associated with the respective broadcaster based on the respective secondary server location included in the terrestrial broadcast channel information;
    determining, for each of the at least one broadcaster associated with the predetermined geographical region, whether the broadcast channel associated with the respective broadcaster is receivable by the reception apparatus based on the service information retrieved from the secondary server associated with the respective broadcaster; and
    generating the list of accessible channels that includes any broadcast channels determined to be receivable by the reception apparatus.

2. The method of claim 1, further comprising:
    identifying the at least one broadcaster based on the terrestrial broadcast channel information and based on a geographical location of the reception apparatus, each of the at least one broadcaster being associated with a broadcast channel estimated to be receivable by the reception apparatus.

3. The method of claim 1, wherein the service information for each of the at least one broadcaster includes one or a combination of the broadcast channel, one or more modulation modes, metadata describing a broadcast multiplex carried on the broadcast channel, a description of one or more services available within the broadcast multiplex, and program guide data.

4. The method of claim 1, wherein the broadcast channel is a digital television broadcast channel.

5. The method of claim 1, wherein the step of determining comprises:
    tuning to each broadcast channel associated with one of the at least one broadcaster; and
    when the reception apparatus is tuned to the respective broadcast channel, determining whether a characteristic of a terrestrial broadcast signal carried on the respective broadcast channel is greater than or equal to a predetermined threshold value.

6. The method of claim 1, wherein the step of retrieving from the primary server comprises:
    retrieving the terrestrial broadcast channel information associated with the predetermined geographical region based on one or a combination of country, state, city, province, zip code, and longitude-latitude.

7. The method of claim 1, further comprising:
    periodically updating the list of accessible channels based on any new broadcast channels that are determined to be receivable by the reception apparatus.

8. The method of claim 1, wherein the reception apparatus is a mobile device.

9. The method of claim 1, wherein the primary server is managed by a government entity that manages wireless spectrum within the predetermined geographical region.

10. A non-transitory computer-readable storage medium storing a program which when executed by a computer, causes the computer to perform the method of claim 1.

11. A reception apparatus, comprising:
    circuitry configured to
        retrieve from a primary server, via a communication network, terrestrial broadcast channel information associated with a predetermined geographical region, the terrestrial broadcast channel information including, for each broadcaster associated with the predetermined geographical region, one or a combination of a broadcast channel and a secondary server location associated with the respective broadcaster,
        retrieve, for each of at least one broadcaster associated with the predetermined geographical region, service information via the Internet from a secondary server associated with the respective broadcaster based on the respective secondary server location included in the terrestrial broadcast channel information,
        determine, for each of the at least one broadcaster associated with the predetermined geographical region, whether the broadcast channel associated with the respective broadcaster is receivable by the reception apparatus based on the service information retrieved from the secondary server associated with the respective broadcaster, and
        generate a list of accessible channels that includes any broadcast channels determined to be receivable by the reception apparatus.

12. The reception apparatus of claim 11, wherein the circuitry is further configured to identify the at least one broadcaster based on the terrestrial broadcast channel information and based on a geographical location of the reception apparatus, each of the at least one broadcaster being associated with a broadcast channel estimated to be receivable by the reception apparatus.

13. The reception apparatus of claim 11, wherein the service information for each of the at least one broadcaster includes one or a combination of the broadcast channel, one or more modulation modes, metadata describing a broadcast multiplex carried on the broadcast channel, a description of one or more services available within the broadcast multiplex, and program guide data.

14. The reception apparatus of claim 11, wherein the broadcast channel is a digital television broadcast channel.

15. The reception apparatus of claim 11, wherein the circuitry is further configured to
tune to each broadcast channel associated with one of the at least one broadcaster; and
when the reception apparatus is tuned to the respective broadcast channel, determine whether the respective broadcast channel is receivable by the reception apparatus based on whether a characteristic of a terrestrial broadcast signal carried on the respective broadcast channel is greater than or equal to a predetermined threshold value.

16. The reception apparatus of claim 11, wherein the circuitry is configured to retrieve the terrestrial broadcast channel information associated with the predetermined geographical region based on one or a combination of country, state, city, province, zip code, and longitude-latitude.

17. The reception apparatus of claim 11, wherein the circuitry is further configured to periodically update the list of accessible channels based on any new broadcast channels that are determined to be receivable by the reception apparatus.

18. The reception apparatus of claim 11, wherein the reception apparatus is a mobile device.

19. The reception apparatus of claim 11, wherein the primary server is managed by a government entity that manages wireless spectrum within the predetermined geographical region.

20. The reception apparatus of claim 11, wherein
the communication network is the Internet, and
the primary server is separate from the secondary server.

21. An information providing apparatus, comprising:

a memory configured to store service information associated with at least one broadcaster that broadcasts a digital television signal to a reception apparatus, the service information including, for each of the at least one broadcaster, one or a combination of a broadcast channel, one or more modulation modes, metadata describing a broadcast multiplex carried on the broadcast channel, a description of one or more services available within the broadcast multiplex, and program guide data; and circuitry configured to provide via the Internet the service information to a reception apparatus that is configured to determine, for each of the at least one broadcaster, whether the broadcast channel associated with the respective broadcaster is receivable by the reception apparatus based on the provided service information, wherein the service information is requested by the reception apparatus from the information providing apparatus based on a server location included in terrestrial broadcast channel information received from another information providing apparatus, the digital television signal is broadcast on the broadcast channel, and the service information is provided via the Internet.

* * * * *